(No Model.) 4 Sheets—Sheet 1.
C. E. SCRIBNER.
REGULATOR FOR DYNAMO ELECTRIC MACHINES.
No. 512,227. Patented Jan. 2, 1894.
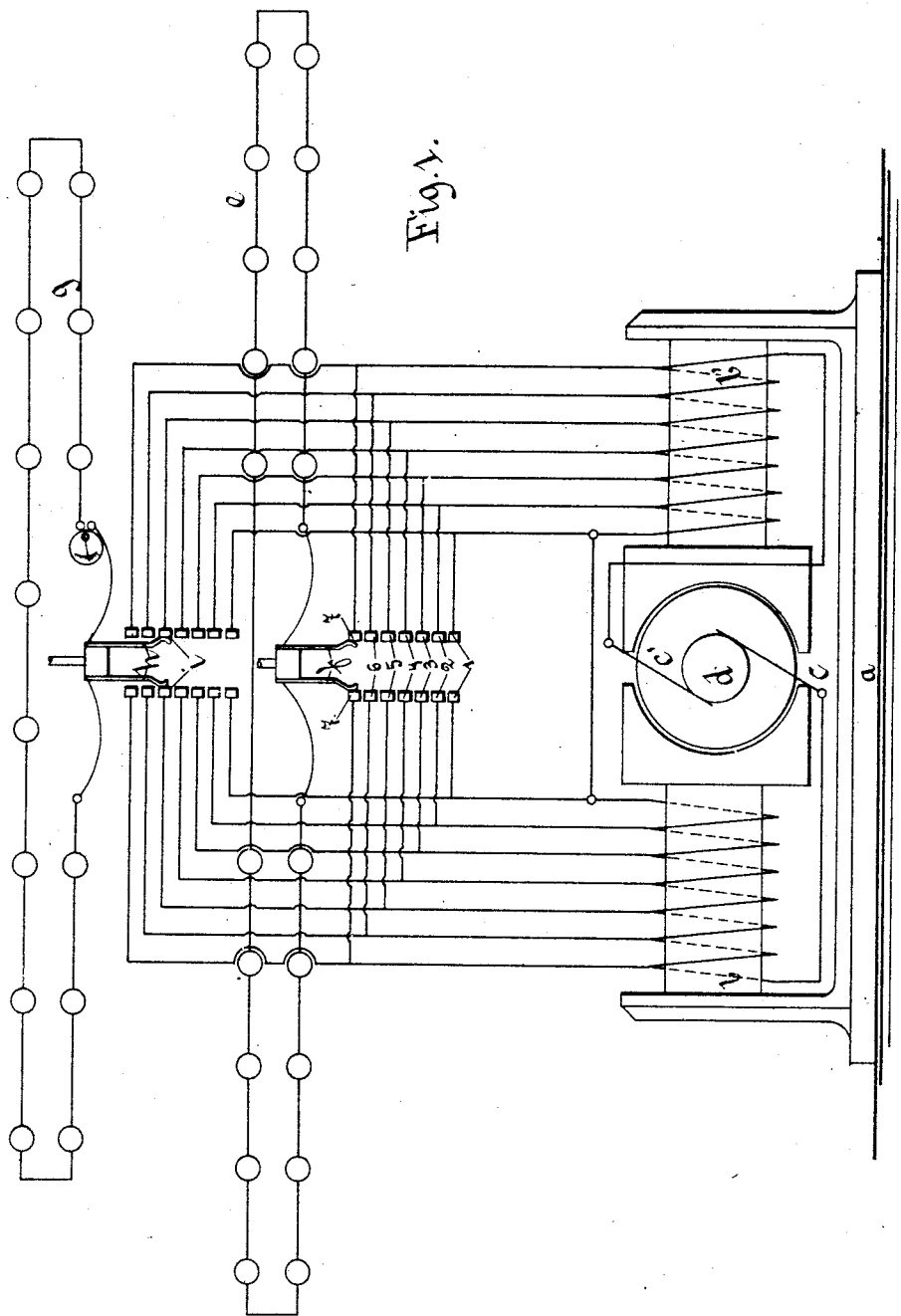
Witnesses:
Edw. O. Zwirtusch.
Chas. C. Woodworth.
Inventor.
Chas. E. Scribner.
by George P. Barton
Attorney.

(No Model.)  4 Sheets—Sheet 2.
C. E. SCRIBNER.
REGULATOR FOR DYNAMO ELECTRIC MACHINES.
No. 512,227.  Patented Jan. 2, 1894.
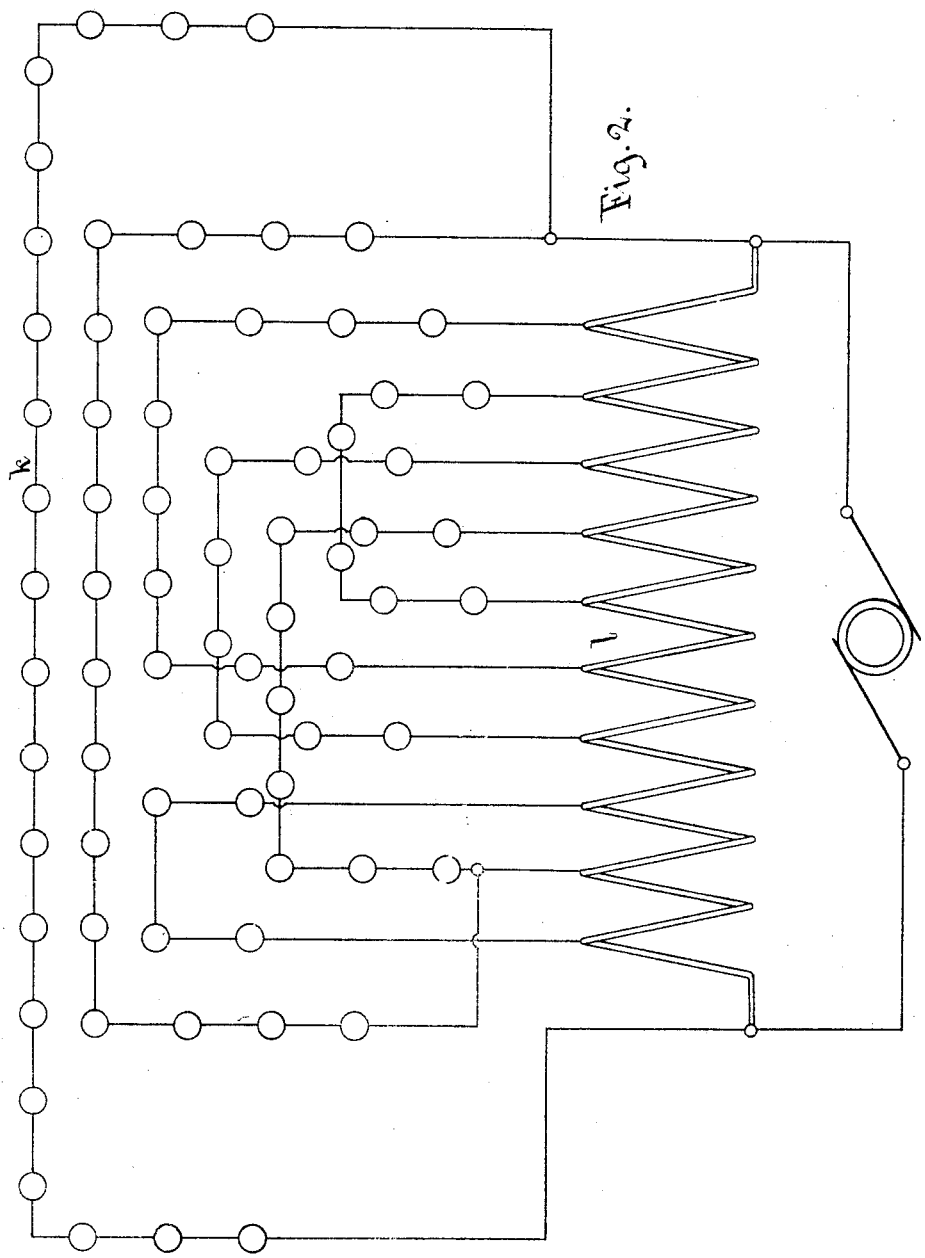

(No Model.) 4 Sheets—Sheet 3.
C. E. SCRIBNER.
REGULATOR FOR DYNAMO ELECTRIC MACHINES.
No. 512,227. Patented Jan. 2, 1894.
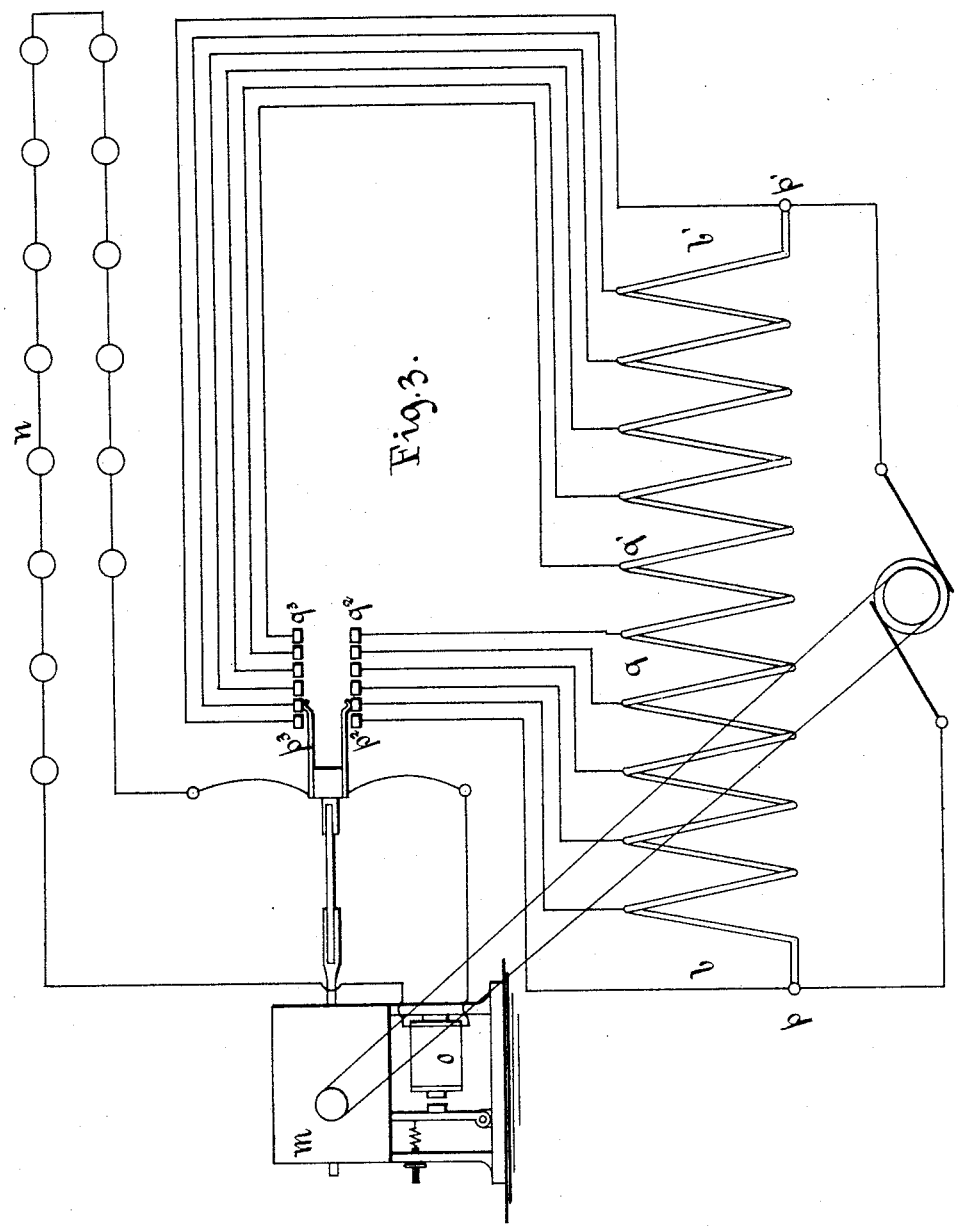
Witnesses:
Edw. O. Zwietusch.
Chas. C. Woodworth.
Inventor.
Chas. E. Scribner.
by George P. Barton
Attorney.

(No Model.)  4 Sheets—Sheet 4.
C. E. SCRIBNER.
REGULATOR FOR DYNAMO ELECTRIC MACHINES.
No. 512,227.  Patented Jan. 2, 1894.
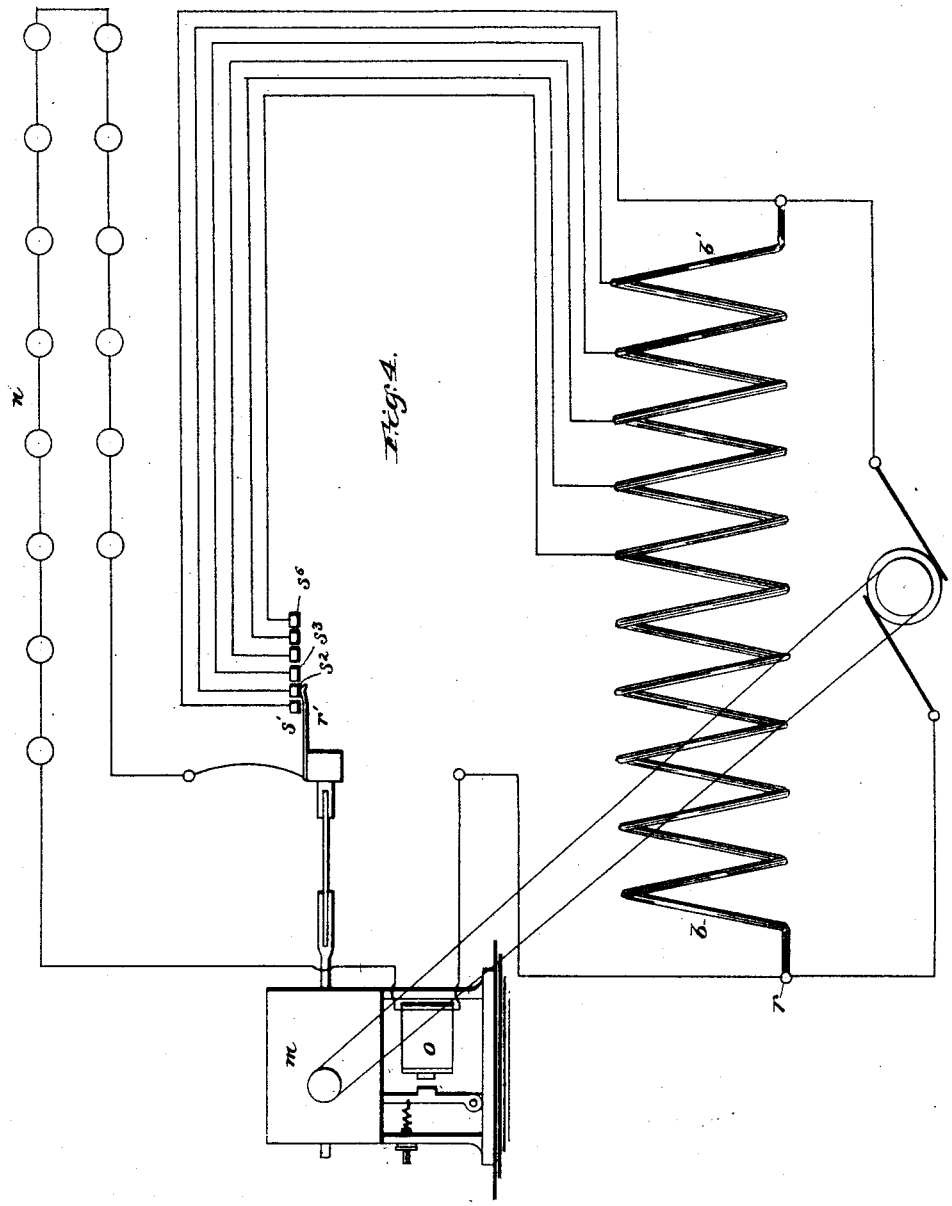

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

REGULATOR FOR DYNAMO-ELECTRIC MACHINES.

SPECIFICATION forming part of Letters Patent No. 512,227, dated January 2, 1894.

Application filed December 29, 1887. Serial No. 259,352. (No model.)

*To all whom it may concern:*

Be it known that I, CHARLES E. SCRIBNER, a citizen of the United States, residing at Chicago, in the county of Cook and State of Illinois, have invented a certain new and useful Improvement in Electric-Light Circuits, (Case No. 153,) of which the following is a full, clear, concise, and exact description, reference being had to the accompanying drawings, forming a part of this specification.

My invention relates to electric light circuits, and its object is to provide a system of electrical distribution whereby two or more circuits including incandescent lamps, or other converters, may be fed from the same source, and the electro-motive force varied so as to maintain a practically constant current upon each of the circuits.

In my system, as hereinafter described, the source of electricity is a constant potential dynamo electric machine in which the brushes are fixed at the maximum points upon the commutator, while the machine is driven at a constant rate of speed. The field magnets of the machine are shunt wound, a sufficient number of ampère turns being used to bring the field magnet cores to saturation before the lamps are brought into circuit.

My invention consists more especially in the manner of connecting the lamp circuits with the different points of the coils of the field magnets and in the manner of automatically shifting the connections of the circuits so as to include in each particular circuit a sufficient number of coils to give the electro-motive force necessary to maintain the current strength as the resistances of the circuits vary.

In the accompanying drawings I have illustrated my invention as applied to a system of incandescent electric illumination.

Figure 1, Sheet 1, is a diagrammatic view illustrative thereof. Fig. 2, Sheet 2, is a diagram illustrating the manner of making the connections between the lamp circuits and the coils of the field magnet, its object being to maintain a constant current strength upon each of the lamp circuits, and, at the same time, prevent any particular coil or coils of the field magnet from receiving an undue amount of current. Fig. 3 shows the connections with the automatic regulator. Fig. 4 shows a modification in which the circuit has a fixed or stationary point of connection at one end with the field magnet coil and a single movable brush at the other end adapted to be moved by the regulator over contacts connected with different portions of the coil to vary the electro motive force.

In Fig. 1, $a$ is a dynamo electric machine having its field magnet coils $b$, $b'$, included in circuit between brushes $c$, $c'$. These brushes $c$, $c'$, may be considered as bearing upon the points of maximum current of the commutator $d$. Any desired number of lamp circuits may be fed from the same source of electricity. I have, in Fig. 1, illustrated two lamp circuits. Circuit $e$ is fed by current which is derived from the machine through the medium of a pair of spring fingers $f$ adapted to make contact, as shown, with any pair of connecting blocks 1, 2, 3, 4, 5, 6, 7. As shown in said Fig. 1, the said spring fingers are in contact with blocks 7. Circuit $g$ is, in like manner, connected with a pair of spring fingers $h$, said spring fingers being shown in connection with connecting blocks $i$, said blocks $i$ corresponding in position to the pair of blocks 5 of spring finger $f$.

I have, by means of regulators like the one shown in my application, Case No. 143, filed November 19, 1887, Serial No. 255,596, varied automatically the position of spring fingers $f$ and $h$ with respect to their different sets of connecting blocks, as required. If the resistance of the lamp circuit decreases, the spring fingers are automatically lowered by the regulator so as to connect with a pair of contact blocks including a smaller number of convolutions of the field magnet coils. Thus, if spring fingers $f$ were in contact with a pair of blocks 1, there would be practically no current derived through said spring fingers to feed the lamp circuit $e$.

As shown, spring fingers $f$ connect with a pair of blocks 7 which are connected respectively with the extremities of the field coils nearest the brushes, and hence the maximum electro-motive force is being used by circuit $e$. On the other hand, spring fingers $h$ of circuit $g$ are shown in contact with contact pieces $i$. These contact pieces $i$ are connected with intermediate coils of the field magnet windings $b$ and $b'$; hence the electro-motive force used by circuit $g$ will be less than that used by circuit $e$. I have therefore shown in circuit $g$ a smaller number of lamps than are shown in connection with circuit $e$.

In the practical working of my system, any variation in the resistance of a circuit varies the position of the spring finger connections of that circuit with respect to their set of contact blocks, and in this manner the current strength is maintained practically uniform. The spring fingers should be in contact only with one set of blocks at the same time.

As shown in Fig. 2, lamp circuit $k$ is shown connected with the extreme ends of the field coils $l$. The other lamp circuits illustrated in Fig. 2 are variously disposed with respect to the coils. It is apparent that these circuits may each have a fixed or stationary point of connection, and a single movable brush at the other end as shown in Fig. 4. The regulator $m$ may be connected with the spring fingers of any circuit and driven by a belt connected with the shaft of the armature, as shown in Fig. 3. When the resistance of the lamp circuit $n$, which includes the electro-magnet $o$ of the regulator, is changed, the regulator operates to move the position of the spring fingers so as to shunt a greater or less number of the field magnet coils $b, b'$. It will be understood that the difference in potential between the points $p, p'$ will be greater than the difference of potential between any other of the terminals, as $q, q'$. The points $p, p'$, it will be seen, are connected respectively with blocks $p^2, p^3$, while points $q, q'$ are connected respectively with points $q^2, q^3$ of the series of pairs of contact blocks between which the spring fingers are automatically moved.

As shown in Fig. 4, the circuit $n$, which is to be supplied with current, is connected, after passing through the magnet $o$ of the regulator, with the field magnet coil at $r$; the other end of this circuit is connected with the sliding spring finger $r'$ controlled by the regulator $m$. This spring finger $r'$ is adapted to slide over and form contact with contact points $s', s^2, s^3$, &c., these contacts being connected at different points on the field magnet coils $b\ b'$; and the regulator operates to move the spring finger $r'$ over the contact points so as to shunt a greater or less number of the coils of the field magnets $b\ b'$ in response to changes in the resistance of the lamp circuit $n$, which includes the electro magnet $o$ of the regulator.

The regulator is so adjusted and connected with the spring fingers that when the resistance of the lamp circuit is decreased, the spring fingers will be moved from one pair of contact blocks to another until a pair is reached having the required difference of potential to maintain the current at the desired strength. If more resistance is included in the circuit, the regulator serves to move the spring fingers back to contact with a pair of contact blocks between which there is a greater difference of potential. Thus the current strength is maintained constant upon each lamp circuit, the difference of potential from brush to brush of the machine remaining constant.

I have described an automatic regulator in connection with my device, this being the preferable mode of changing the circuit; yet it is evident that the spring fingers might be moved by hand, or otherwise, to maintain the current strength, the proper direction of movement being indicated by an ammeter included in the lamp circuit. Such an ammeter I have shown in Fig. 1 in connection with circuit $g$.

I have shown the contact blocks arranged in pairs. It is evident, however, that instead of having them arranged in pairs as shown, the contacts on one side, as, for example, those from $p^3$ to $q^3$, might be united in a single strip and connected with only a single point, as, for example, point $p'$ of the field magnet coil, in which case the spring fingers would be moved between a single strip on one side and a series of contacts on the other side, as will be readily understood by those skilled in the art. I therefore do not limit myself in this patent to the precise construction shown, as my invention admits of various modifications which would readily suggest themselves to those acquainted with electrical distribution.

Having thus described my invention, I claim as new and desire to secure by Letters Patent—

1. The combination with the coils of the field magnet of a shunt wound dynamo electric machine, of contacts connected in pairs with different portions of said coils, and an adjustable contact closer device consisting of two insulated pieces or spring fingers adapted to be automatically adjusted between different pairs of said contacts to vary the difference of potential between the spring fingers, and an electric light circuit connected with said spring fingers, whereby the current in said circuit may be maintained at a uniform strength, substantially as described.

2. The method of regulating the current supplied to a working circuit from a dynamo electric machine, which consists in changing coils of the field magnets from a shunt to a series relation with the working circuit, and vice versa; whereby the strength of the field magnets is changed, substantially as described.

3. The coils of the field magnet of a shunt-wound dynamo electric machine, in combination with contacts connected with different portions of said coils and an adjustable contact closer device consisting of two insulated pieces or spring fingers, and an electric light circuit connected with said contact pieces; whereby the current in said circuit may be maintained at a uniform strength, substantially as described.

In witness whereof I hereunto subscribe my name this 16th day of December, A. D. 1887.

CHARLES E. SCRIBNER.

Witnesses:
C. C. WOODWORTH,
GEORGE P. BARTON.